United States Patent
Tsurbeleu et al.

(10) Patent No.: US 10,084,785 B2
(45) Date of Patent: Sep. 25, 2018

(54) CONNECTING AND RETRIEVING SECURITY TOKENS BASED ON CONTEXT

(71) Applicant: Microsoft Technology Licensing, LLC., Redmond, WA (US)

(72) Inventors: Pavel Tsurbeleu, Bellevue, WA (US); Shriram Natarajan, Redmond, WA (US); Vladimir Pogrebinsky, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 210 days.

(21) Appl. No.: 15/135,673

(22) Filed: Apr. 22, 2016

(65) Prior Publication Data

US 2017/0171211 A1    Jun. 15, 2017

Related U.S. Application Data

(60) Provisional application No. 62/266,660, filed on Dec. 13, 2015.

(51) Int. Cl.
| | |
|---|---|
| *H04L 29/06* | (2006.01) |
| *G06F 21/10* | (2013.01) |
| *G06F 21/41* | (2013.01) |
| *H04L 29/08* | (2006.01) |

(52) U.S. Cl.
CPC .............. *H04L 63/10* (2013.01); *G06F 21/10* (2013.01); *H04L 63/0815* (2013.01); *G06F 21/41* (2013.01); *H04L 63/0227* (2013.01); *H04L 63/08* (2013.01); *H04L 67/02* (2013.01); *H04L 67/10* (2013.01)

(58) Field of Classification Search
CPC ........................................................ H04L 63/10
USPC .............................................................. 726/7
See application file for complete search history.

(56) References Cited

U.S. PATENT DOCUMENTS

| | | | |
|---|---|---|---|
| 7,526,798 | B2 | 4/2009 | Chao et al. |
| 8,762,512 | B1 | 6/2014 | Sundaram et al. |
| 8,813,174 | B1* | 8/2014 | Koeten ............... H04L 67/10 709/223 |
| 8,832,857 | B2 | 9/2014 | Court et al. |
| 8,924,569 | B2 | 12/2014 | Li |
| 9,313,100 | B1* | 4/2016 | Jenkins ............ H04L 63/0421 |
| 2012/0023556 | A1* | 1/2012 | Schultz .............. G06F 21/41 726/4 |
| 2012/0254957 | A1 | 10/2012 | Fork et al. |
| 2013/0024919 | A1 | 1/2013 | Wetter et al. |
| 2013/0204994 | A1 | 8/2013 | Deshmukh et al. |
| 2013/0269020 | A1 | 10/2013 | Griffin et al. |

(Continued)

OTHER PUBLICATIONS

"International Search Report and Written Opinion Issued in PCT Application No. PCT/US2016/065030", dated Mar. 23, 2017, 15 Pages.

(Continued)

*Primary Examiner* — Longbit Chai
(74) *Attorney, Agent, or Firm* — Workman Nydegger (57) ABSTRACT

An application may be configured with two or more cloud contexts and one or more identity Systems. Using this information, the application has the ability to identify the remote cloud environment that a particular subsystem needs to interact with. The application communicates with the appropriate identity system to retrieve tokens dynamically for targeting that remote cloud.

20 Claims, 4 Drawing Sheets

(56) References Cited

U.S. PATENT DOCUMENTS

| | | |
|---|---|---|
| 2014/0075033 A1 | 3/2014 | Doering et al. |
| 2014/0282938 A1 | 9/2014 | Moisa |
| 2014/0317701 A1 | 10/2014 | Eicken et al. |
| 2014/0366080 A1 | 12/2014 | Gupta et al. |
| 2015/0019735 A1 | 1/2015 | Pogrebinsky et al. |
| 2015/0121462 A1 | 4/2015 | Courage et al. |
| 2015/0188906 A1 | 7/2015 | Minov et al. |

OTHER PUBLICATIONS

Ahmad, et al., "A Multi-token Authorization Strategy for Secure Mobile Cloud Computing", in Proceedings of 2nd IEEE International Conference on Mobile Cloud Computing, Services, and Engineering, Apr. 8, 2014, pp. 136-141.

"Second Written Opinion Issued in PCT Application No. PCT/US2016/065030", dated Sep. 6, 2017, 8 Pages.

"International Preliminary Report on Patentability Issued in PCT Application No. PCT/US2016/065030", dated Mar. 21, 2018, 10 Pages.

* cited by examiner

CONNECTING AND RETRIEVING SECURITY TOKENS BASED ON CONTEXT

CROSS-REFERENCE TO RELATED APPLICATIONS

This application claims the benefit of the filing date of U.S. Provisional Patent Application No. 62/266,660, which is titled "User Experience Capable of Connecting and Retrieving Security Tokens Based on Context" and was filed Dec. 13, 2015, the disclosure of which is hereby incorporated by reference herein in its entirety.

BACKGROUND

When an application provides an integrated user experience with user interface (UI) components aggregated from different distributed systems, the application must be aware of the security context and authentication models associated with the remote system. This is necessary for the user to be able to authenticate to the remote system to be able to both manage resources in the remote system(s) and in the local system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments allow an application to be configured with two or more cloud contexts and one or more Identity Systems. With that information, the application has the ability to identify the cloud environment that a particular subsystem needs to interact with, and will be able to talk to the appropriate identity system to retrieve tokens dynamically for targeting that cloud. Embodiments further provide a user experience capable of connecting and retrieving security tokens based on cloud context in a multi-cloud environment.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
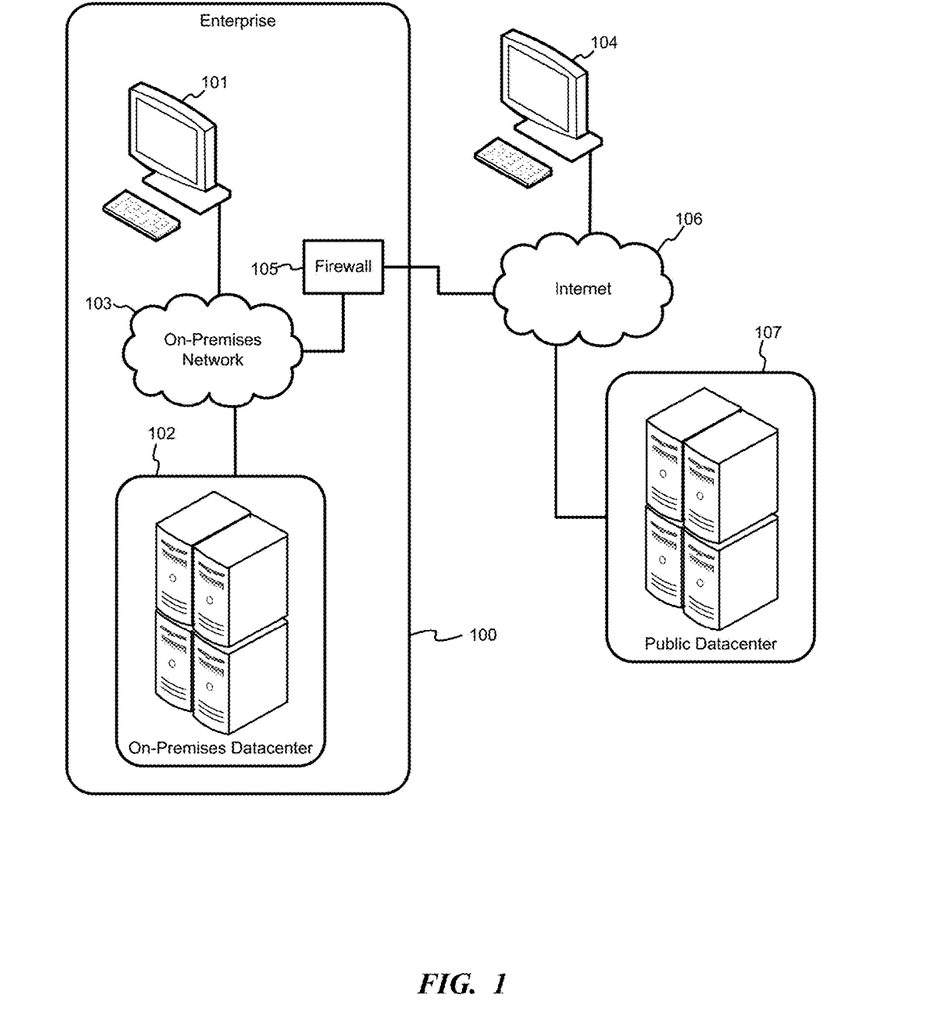
FIG. 1 is a high level block diagram of a system that provides enterprise users with access to local, on-premises resources and to remote or public resources.

FIG. 1 is a high level block diagram of a system that provides enterprise users with access to local, on-premises resources and to remote or public resources. Local enterprise terminal 101 allows users to directly access on-premises datacenter 102 via on-premises network 103. Users located outside enterprise 100 may access on-premises datacenter 102 using remote terminal 104. Terminals 101 and 104 may be, for example, a desktop, laptop, notebook, or tablet computer. Other devices, such as dedicated terminals, smartphones, personal digital assistants (PDA), etc. may also be used as terminals 101 and 104.

Firewall 105 provides network security system for enterprise 100 and controls incoming and outgoing network traffic. External terminal 104 may connect to enterprise on-premises network 103 via Internet 106 or any public or private network. Firewall 105 allows terminal 104 to access on-premises datacenter 102 if terminal 104 provides the appropriate credentials and authentication. Enterprise users at terminals 101 and 104 may also access public datacenter 107 via Internet 106.

On-premises datacenter 102 and public datacenter 107 may provide "cloud computing" services to enterprise 100 and other users. By freeing enterprise users from managing information technology (IT) infrastructure, cloud computing provides virtually limitless compute, storage, and network resources at low cost, while allowing services to scale on demand.

Figure 2:
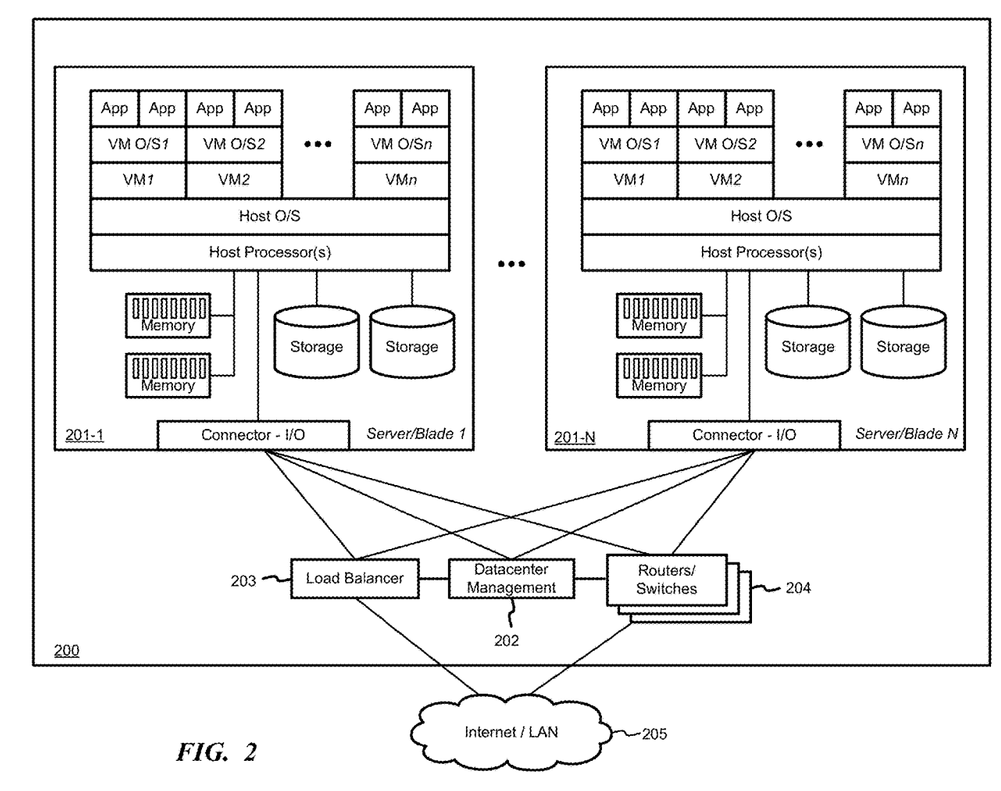
FIG. 2 is a block diagram of a datacenter that provides cloud computing services or distributed computing services according to one embodiment.

FIG. 2 is a block diagram of a distributed computing network or datacenter 200 that provides cloud computing services or distributed computing services according to one embodiment. A plurality of servers 201 are managed by datacenter management controller 202. Load balancer 203 distributes requests and workloads over servers 201 to avoid a situation where a single server 201 becomes overwhelmed and to maximize available capacity and performance of the resources in datacenter 200. Routers/switches 204 support data traffic between servers 201 and between datacenter 200 and external resources and users via external network 205, which may be a local area network (LAN) in the case of an enterprise, on-premises datacenter 102 or the Internet in the case of a public datacenter (107).

Servers 201 may be traditional standalone computing devices and/or they may be configured as individual blades in a rack of many server devices. Servers 201 have an input/output (I/O) connector that manages communication with other database entities. One or more host processors on each server 201 run a host operating system (O/S) that supports multiple virtual machines (VM). Each VM may run its own O/S so that each VM O/S on a server is different, or the same, or a mix of both. The VM O/S's may be, for example, different versions of the same O/S (e.g., different VMs running different current and legacy versions of the Windows® operating system). In addition, or alternatively, the VM O/S's may be provided by different manufacturers (e.g., some VMs running the Windows® operating system, while others VMs run the Linux® operating system). Each VM may then run one or more applications (App). Each server also includes storage (e.g., hard disk drives (HDD)) and memory (e.g., RAM) that can be accessed and used by the host processors and VMs.

Cloud computing is the delivery of computing capabilities as a service, making access to IT resources like compute power, networking and storage as available as water from a faucet. As with any utility, you generally only pay for what you use with cloud computing. By tapping into cloud services, users can harness the power of massive data centers without having to build, manage or maintain costly, complex IT building blocks. With the cloud, much of the complexity of IT is abstracted away, letting you focus just on the infrastructure, data and application development that really matter to your business.

Datacenter 200 provides pooled resources on which customers or tenants can dynamically provision and scale applications as needed without having to add more servers or additional networking. This allows tenants to obtain the computing resources they need without having to procure, provision, and manage infrastructure on a per-application, ad-hoc basis. A cloud computing datacenter 200 allows tenants to scale up or scale down resources dynamically to meet the current needs of their business. Additionally, a datacenter operator can provide usage-based services to tenants so that they pay for only the resources they use, when they need to use them. For example, a tenant may initially use one VM on server 201-1 to run their applications. When demand increases, the datacenter may activate additional VMs on the same server and/or on a new server 201-N as needed. These additional VMs can be deactivated if demand later drops.

Datacenter 200 may offer guaranteed availability, disaster recovery, and back-up services. For example, the datacenter may designate one VM on server 201-1 as the primary location for the tenant's application and may activate a second VM on the same or different server as a standby or back-up in case the first VM or server 201-1 fails. Database manager 202 automatically shifts incoming user requests from the primary VM to the back-up VM without requiring tenant intervention. Although datacenter 200 is illustrated as a single location, it will be understood that servers 201 may be distributed to multiple locations across the globe to provide additional redundancy and disaster recovery capabilities.

The datacenter operator may offer different levels of cloud computing services to tenants. With an Infrastructure-as-a-Service (IaaS) offering, the lower levels of the IT stack are delivered as a service, which frees up developers from much of the complexity of provisioning physical machines and configuring networks. With IaaS, tenants can easily provision virtual machines in a highly scalable and available cloud environment, develop and test solutions, then deploy applications to production. With a Platform-as-a-Service (PaaS) offering, everything from network connectivity through the runtime is provided. PaaS makes development easy by providing additional support for application services and management of the operating system, including updates. With PaaS, tenants can focus on the business logic of application and quickly move applications from concept to launch. With a Software-as-a-Service (SaaS) offering, a single finished application or suite of applications can be delivered to customers through a web browser, thereby eliminating their need to manage the underlying components of the IT stack including application code.

Referring again to FIG. 1, an enterprise may use a public datacenter or public cloud computing services to take advantage of cost savings, reduced management requirements, or particular services offered. On the other hand, the enterprise may also use an on-premises datacenter or private cloud services to ensure data security or to use a proprietary application, for example. It will be understood that an enterprise does not have to use an on-premises datacenter to take advantage of private cloud services. Instead, private cloud services may be provided by a datacenter that limits access to the enterprise. The use of both public cloud services and private cloud services by an enterprise is referred to generally as a hybrid cloud.

Figure 3:
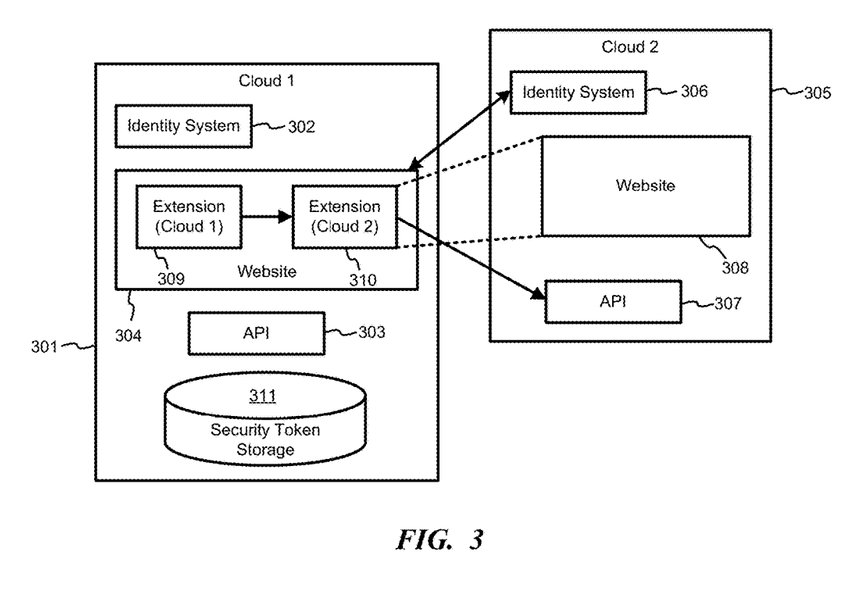
FIG. 3 is a block diagram illustrating interaction between two cloud systems.

FIG. 3 is a block diagram illustrating interaction between two cloud systems. Each cloud system 301, 305 has its own identity system 302, 306 and its own API layer 303, 307. Website 304 runs on cloud system 301 and uses the identity system 302 and API layer 303 for cloud system 301. A separate website 308 runs on cloud system 305 and uses the identity system 306 and API layer 307 for cloud system 305. Website 304 comprises extension 309, which is loaded from local cloud system 301, and extension 310, which is loaded from remote cloud system 305.

Embodiments enable a seamless user experience wherein a user is able to navigate from components in website 304 to components of another website 308 running on another cloud. This can occur without requiring website 304 to actually open the other website 308. This enables communication patterns between two cloud systems 301, 305 that can be managed within the context of one cloud system 301.

The system is capable of understanding from which cloud an extension is loaded. For example, website 304 and cloud system 301 understand that extension 309 is loaded from cloud system 301 and extension 310 is loaded from cloud system 305. The system is capable of fetching identity tokens from an identity system in the corresponding cloud. This sets up the security context needed for the extension to communicate with the API layer of that cloud. For example, when an extension 310 from another cloud system is to be loaded, cloud system 301 fetches identity tokens from identity system 306 in cloud system 305 to set up a security context for extension 310. Extension 310 will then send requests to the API layer 307 in cloud system 305 using this security context.

Content from both websites 304 and 308 may be rendered in the same inline frame (IFrame) in a browser, wherein the HTML Inline Frame Element (<iframe>) represents a nested browsing context, effectively embedding another HTML page into the current page. An inline frame is used to embed another document within the current HTML document. In FIG. 3, for example, the frame 310 is embedded within website 304. Accordingly, cloud extensions 309 for cloud system 301 are separate from cloud extensions 310 for cloud system 305. The extensions provide the necessary security context for their respective cloud service, but the security credentials do not need to be shared between the cloud system 301, 305. Instead, they are isolated in separate frames embedded within the code for website 304. So a browser can access content from both cloud system 301, 305 on website 304, but users on the website 304 do not have access to both cloud systems 301, 305. To a user accessing website 304, access to each cloud service is seamless since the website 304 handles the security context for each cloud service as necessary depending upon the extensions.

This method allows multiple cloud services 301, 305 to interoperate with one another and to load individual components 309, 310 from each other to provide a seamless experience. Other embodiments are not limited to websites 304, 308, but allow any resource or application to load components from remote clouds and to obtain appropriate tokens from a corresponding remote identity system. Application and resources, such as websites 304, 308, may be configured by a resource provider running on cloud services 301, 305.

With the advent of different types of cloud-based systems (e.g. different public, private, and hybrid cloud systems), the capability of the cloud systems to interoperate enables more advanced scenarios where the individual capabilities of each cloud can be combined to provide a comprehensive end user experience. Storage 311 may be used to store security tokens for users. The security tokens may be stored, for example, as a key chain for each user and may be associated with each of the different cloud services and distributed computing networks to which the user is subscribed.

This system provides the following advantages.

Cloud context awareness—a website or application running on one cloud service understanding properties of the different clouds to which a local cloud is connected. For example, a user may be connected to a public cloud (such as Microsoft Azure) and a private cloud (such as Microsoft Azure Stack) simultaneously from the same browser in the same session.

Token retrieval based on cloud context awareness. Based on an application's understanding of the UI components and the corresponding remote cloud they come from, the application reaches out to the authentication system of the remote cloud to fetch security tokens on behalf of the current user Key chain for tokens—maintaining a chain of tokens for the user targeting different clouds and appropriately issuing them to the UI components of that cloud.

Embodiments further provide the ability for users to use a single log-in to access multiple clouds. The user can manage multiple clouds by logging into applications on one cloud system, which then identifies other clouds that can communicate with the first cloud. The first cloud contacts the identity service on the other clouds and obtains appropriate tokens. The first cloud can then automatically communicate with the other clouds. The first cloud can identify resource and remote identity systems on the fly and obtain the necessary tokens to communicate with the remote clouds.

Figure 4:
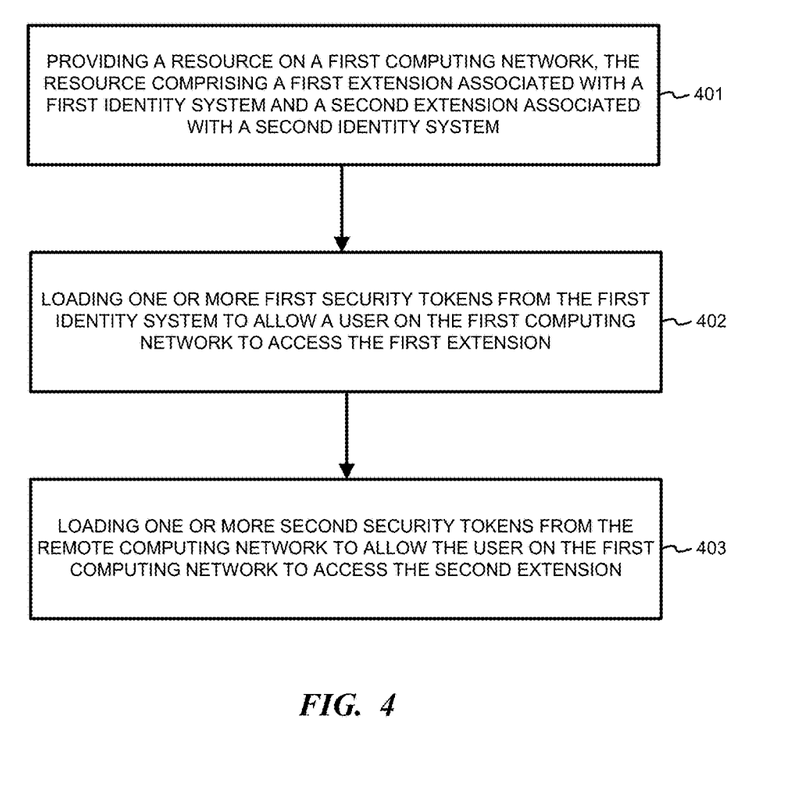
FIG. 4 is a flowchart illustrating an example method for accessing resources across a plurality of distributed computing networks.

FIG. 4 is a flowchart illustrating an example method for accessing resources across a plurality of distributed computing networks. In step 401, a resource is provided on a first computing network. The resource comprises a first extension associated with a first identity system and a second extension associated with a second identity system. The first identify system is hosted on the first computing network and the second identity system is hosted on a remote computing network. In step 402, one or more first security tokens are loaded from the first identity system to allow a user on the first computing network to access the first extension. In step 403, one or more second security tokens are loaded from the remote computing network to allow the user on the first computing network to access the second extension.

In other embodiments, the user is identified on the first computing network and then security tokens are retrieved from the remote computing network based upon the user's identity. The second identity system may be an authentication system. The user may access both the first extension and the second extension on the resource. The resource may be, for example, a website and the extensions may correspond to windows displayed on the website. The first computing network and the remote computing network may be a combination of a private cloud service and a public cloud service.

An example system comprises a first cloud system hosting a first resource having a first extension, the first cloud system having a first identity system and first API layer used by the first resource and the first extension; and the resource having a second extension loaded from a second cloud system having a second identity system and second API layer, wherein the first cloud system loads security tokens from the second identity system to allow the second extension to communicate using the second API layer.

In additional embodiments of the system, the resource is a website.

In additional embodiments of the system, the first cloud is a public cloud and the second cloud is a private cloud.

In additional embodiments of the system, the first cloud is a private cloud and the second cloud is a public cloud.

In additional embodiments of the system, a user may be connected to both the first and second clouds simultaneously from the same browser in the same session.

In additional embodiments of the system, an application on the first cloud fetches security tokens from an authentication system of the second cloud on behalf of a current user.

In additional embodiments of the system, the first cloud system maintains a chain of security tokens for a user, and wherein the security tokens target different clouds.

In additional embodiments of the system, the security tokens are issued to the UI components of first cloud based upon an associated remote cloud.

In additional embodiments of the system, a browser, wherein content from a website hosted on the first cloud and content from a website hosted on the second cloud is rendered in the same inline frame in the browser.

An example method for accessing resources across a plurality of distributed computing networks comprises providing a resource on a first computing network, the resource comprising a first extension associated with a first identity system and a second extension associated with a second identity system, wherein the first identify system is hosted on the first computing network and the second identity system is hosted on a remote computing network; loading one or more first security tokens from the first identity system to allow a user on the first computing network to access the first extension; and loading one or more second security tokens from the remote computing network to allow the user on the first computing network to access the second extension.

Additional embodiments of the method further comprise identifying the user on the first computing network; and retrieving security tokens from the remote computing network based upon the user's identity.

Additional embodiments of the method further comprise the second identity system is an authentication system.

Additional embodiments of the method further comprise the user access both the first extension and the second extension on the resource.

Additional embodiments of the method further comprise the resource is a website and the extensions correspond to windows displayed on the website.

Additional embodiments of the method further comprise one of the first computing network and the remote computing network is a private cloud service and the other computing network is a public cloud service.

An example system comprises a first distributed computing network hosting a resource having a first extension, the first distributed computing network having a first identity system used by the resource and the first extension; the resource having a second extension loaded from a second distributed computing network having a second identity system, wherein the first distributed computing network loads security tokens from the second identity system to allow users to access the second extension; and storage for maintaining a plurality of security tokens associated with a user, the group of tokens allowing the user to access extensions from a plurality of distributed computing networks.

In additional embodiments of the system, the resource having one or more additional extensions loaded from one or more additional distributed computing networks each having its own identity system and API layer, wherein the first system loads security tokens from the identity systems on the one or more additional distributed computing network to allow users to access the one or more additional extensions.

In additional embodiments of the system, the distributed computing networks include both one or more public cloud service and one or more private cloud service.

In additional embodiments of the system, a user may be connected to both the first and second distributed computing networks simultaneously from the same resource in the same session.

In additional embodiments of the system, an application on the first distributed computing network fetches security tokens from an authentication system of the second distributed computing network on behalf of a current user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for accessing resources by a user across a plurality of distributed computing networks, the system comprising:
    a first cloud system implemented using a hardware processor; and
    a memory storing instructions for execution by the hardware processor, wherein the hardware processor is configured by the instructions to:
    host a first resource having a first extension and a second extension,
    wherein the first cloud system comprises a first identity system and a first API layer used by the first resource and the first extension; and
    wherein the second extension is loaded from a second cloud system different and separate from the first cloud system having a second identity system and second API layer and the user is simultaneously connected to both of the first and the second cloud systems, and
    store a plurality of security tokens associated with the user, the plurality of security tokens allowing the user to access extensions of resources from a plurality of cloud systems through the security tokens and associated API layers, wherein each of the plurality of security tokens corresponding to the user is a key chain for the user and is indicative of an association between one or more cloud systems which the user has subscribed such that the first cloud system loads security tokens from the second identity system to allow the second extension to communicate using the second API layer.

2. The system of claim 1, wherein the resource is a website.

3. The system of claim 1, wherein the first cloud is a public cloud and the second cloud is a private cloud.

4. The system of claim 1, wherein the first cloud is a private cloud and the second cloud is a public cloud.

5. The system of claim 1, wherein a user may be connected to both the first and second clouds simultaneously from the same browser in the same session.

6. The system of claim 1, wherein an application on the first cloud fetches security tokens from an authentication system of the second cloud on behalf of a current user.

7. The system of claim 1, wherein the first cloud system maintains a chain of security tokens for a user, and wherein each security token in the chain for the user and is indicative of an association between one or more distributed computing networks which the user has subscribed.

8. The system of claim 7, wherein the security tokens are issued to the UI components of first cloud based upon an associated remote cloud.

9. The system of claim 1, further comprising:
    a browser, wherein content from a website hosted on the first cloud and content from a website hosted on the second cloud is rendered in the same inline frame in the browser.

10. A method for accessing resources by a user across a plurality of distributed computing networks, comprising:
    providing a resource on a first computing network, the resource comprising a first extension associated with a first identity system and a first API layer in the first computing network and a second extension associated with a second identity system and a second API layer in a different remote computing network and the user is simultaneously connected to both of the first and the second computing networks, wherein the first identify system is hosted on the first computing network and the second identity system is hosted on the remote computing network;
    loading one or more first security tokens from the first identity system to allow a user on the first computing network to access the first extension; and
    loading one or more second security tokens from the remote computing network to allow the user on the first computing network to access the second extension using the second API layer, wherein storing a plurality of security tokens associated with the user, the plurality of security tokens allowing the user to access extensions of the resources from a plurality of computing networks through the security tokens via associated API layers, wherein each of the plurality of security tokens corresponding to the user is a key chain for the user and is indicative of an association between one or more computing networks which the user has subscribed.

11. The method of claim 10, further comprising:
    identifying the user on the first computing network; and
    retrieving security tokens from the remote computing network based upon the user's identity.

12. The method of claim 10, wherein the second identity system is an authentication system.

13. The method of claim 10, wherein the user access both the first extension and the second extension on the resource.

14. The method of claim 10, wherein the resource is a website and the extensions correspond to windows displayed on the website.

15. The method of claim 10, wherein one of the first computing network and the remote computing network is a private cloud service and the other computing network is a public cloud service.

16. A system for accessing resources by a user across a plurality of distributed computing networks, the system comprising:
    a first distributed computing network implemented using a hardware processor; and
    a memory storing instructions for execution by the hardware processor, wherein the hardware processor is configured by the instructions to:
    host a resource having a first extension, wherein the resource and the first extension make use of a first identity system and a first API layer in the first distributed computing network, and wherein the resource comprises a second extension loaded from a second distributed computing network having a second identity system and a second API layer in the second distributed computing network different and separate from the first distributed computing network and the user is simultaneously connected to both of the first and the second distributed computing networks;

and wherein the hardware processor of the first distributed computing network loads security tokens from the second identity system to allow users to access the second extension of the resource using the second API layer; and store a plurality of security tokens associated with the user, the plurality of security tokens allowing the user to access extensions of the resources from a plurality of distributed computing networks through the security tokens and associated API layers, wherein each of the plurality of security tokens corresponding to the user is a key chain for the user and is indicative of an association between one or more distributed computing networks which the user has subscribed.

17. The system of claim 16, further comprising
the resource having one or more additional extensions loaded from one or more additional distributed computing networks each having its own identity system and API layer, wherein the first cloud system loads security tokens from the identity systems on the one or more additional distributed computing network to allow users to access the one or more additional extensions.

18. The system of claim 17, wherein the distributed computing networks include both one or more public cloud service and one or more private cloud service.

19. The system of claim 16, wherein a user may be connected to both the first and second distributed computing networks simultaneously from the same resource in the same session.

20. The system of claim 16, wherein an application on the first distributed computing network fetches security tokens from an authentication system of the second distributed computing network on behalf of a current user.

* * * * *